United States Patent
Brombach

(10) Patent No.: US 11,952,982 B2
(45) Date of Patent: Apr. 9, 2024

(54) METHOD FOR PROVIDING A REQUESTED REAL POWER

(71) Applicant: Wobben Properties GmbH, Aurich (DE)

(72) Inventor: Johannes Brombach, Berlin (DE)

(73) Assignee: Wobben Properties GmbH, Aurich (DE)

(*) Notice: Subject to any disclaimer, the term of this patent is extended or adjusted under 35 U.S.C. 154(b) by 307 days.

(21) Appl. No.: 17/103,589

(22) Filed: Nov. 24, 2020

(65) Prior Publication Data

US 2021/0156358 A1    May 27, 2021

(30) Foreign Application Priority Data

Nov. 27, 2019  (DE) .......................... 102019132120.4

(51) Int. Cl.
  *F03D 7/02*    (2006.01)
  *F03D 9/25*    (2016.01)
  *H02J 3/38*    (2006.01)

(52) U.S. Cl.
  CPC ........... *F03D 7/0284* (2013.01); *F03D 9/257* (2017.02); *H02J 3/381* (2013.01); *F05B 2270/337* (2013.01); *H02J 2300/28* (2020.01)

(58) Field of Classification Search
  CPC ........ F03D 7/0284; F03D 9/257; H02J 3/381; H02J 2300/28; F05B 2270/337
  See application file for complete search history.

(56) References Cited

U.S. PATENT DOCUMENTS

| | | | | |
|---|---|---|---|---|
| 5,742,515 A | * | 4/1998 | Runkle | H02P 9/48 290/40 C |
| 5,892,299 A | * | 4/1999 | Siewert | H02J 9/061 307/64 |
| 6,735,704 B1 | * | 5/2004 | Butka | H02J 3/38 713/340 |
| 7,906,871 B2 | * | 3/2011 | Freeman | H02J 9/005 307/85 |
| 7,962,769 B1 | * | 6/2011 | Patel | G06F 1/26 713/300 |
| 8,247,917 B2 | * | 8/2012 | Yasugi | F03D 9/11 290/44 |
| 8,373,291 B2 | | 2/2013 | Zeumer et al. | |
| 10,468,909 B2 | * | 11/2019 | Navarro | G06F 1/263 |

(Continued)

FOREIGN PATENT DOCUMENTS

| | | |
|---|---|---|
| DE | 102007044601 A1 | 4/2009 |
| WO | 2009/036895 A2 | 3/2009 |
| WO | 2018/100125 A1 | 6/2018 |

*Primary Examiner* — Viet P Nguyen
*Assistant Examiner* — Thomas K Quigley
(74) *Attorney, Agent, or Firm* — Seed IP Law Group LLP

(57) ABSTRACT

A method for providing a requested real power including receiving the requested real power at a transmission feed-in point; using a real power band with an upper band limit and a lower band limit, each of which is disposed with an offset from the requested real power. The real power band furthermore comprises at least one control threshold value between the upper band limit and the lower band limit. The method includes controlling at least one regenerative energy generator depending on the at least one control threshold value, in particular in order to provide the requested real power as transmission power at the transmission feed-in point.

24 Claims, 9 Drawing Sheets

(56) References Cited

U.S. PATENT DOCUMENTS

| | | | |
|---|---|---|---|
| 2008/0106098 A1* | 5/2008 | Miller | H02P 21/22 |
| | | | 290/44 |
| 2008/0122518 A1* | 5/2008 | Besser | H02J 3/381 |
| | | | 327/518 |
| 2010/0077238 A1* | 3/2010 | Vogman | G06F 1/3296 |
| | | | 713/340 |
| 2010/0264741 A1* | 10/2010 | Togare | G06F 1/3206 |
| | | | 307/80 |
| 2011/0181044 A1* | 7/2011 | Scott | H02J 3/1864 |
| | | | 323/211 |
| 2012/0061959 A1* | 3/2012 | Yasugi | H02P 9/10 |
| | | | 290/44 |
| 2012/0248772 A1* | 10/2012 | Shigemizu | H02P 9/10 |
| | | | 290/44 |
| 2013/0300118 A1* | 11/2013 | Bech | F03D 9/257 |
| | | | 290/44 |
| 2014/0015250 A1* | 1/2014 | Teodorescu | F03D 9/257 |
| | | | 290/44 |
| 2018/0358839 A1 | 12/2018 | Perez et al. | |
| 2020/0003181 A1* | 1/2020 | Brombach | H02J 3/381 |
| 2020/0130527 A1* | 4/2020 | Brombach | H02J 15/008 |

* cited by examiner

METHOD FOR PROVIDING A REQUESTED REAL POWER

BACKGROUND

Technical Field

The present invention relates to a method for providing a requested real power to a transmission feed-in point of an electrical supply grid that electrically connects a first voltage segment to a second voltage segment. The present invention also relates to a power regulator for the provision of a requested real power to a transmission feed-in point of an electrical supply grid, a windfarm for the provision of a requested real power to a transmission feed-in point of an electrical supply grid, and a wind power installation for the provision of a requested real power to a transmission feed-in point of an electrical supply grid.

Description of the Related Art

An electrical supply grid, such as for example the European grid and its structure, are generally known.

Fundamentally, an electrical supply grid comprises different grid or voltage segments with different voltage levels.

The different grid or voltage segments are connected together both horizontally, i.e., at an identical voltage level, as well as vertically, i.e., with different voltage levels.

The different grid or voltage segments are moreover connected to one another via transformers or transformer stations.

In addition to this fundamental arrangement of the voltage segments, it is moreover usual for the different voltage segments to have different functions. Essentially, a distinction can be made here between two different functional grids or voltage segments, namely between transmission grid segments and distribution grid segments.

A transmission grid segment essentially transmits power between at least two distribution grids or distribution grid segments. A transmission grid segment is thus essentially provided for the higher-level transfer of power or energy between different grid segments. A plurality of transmission grid segments can, moreover, also be grouped functionally into one transmission grid. Energy generators are for the most part not connected directly to such a transmission grid—a transmission grid thus usually distributes the power generated by power stations nationwide. Transmission grids are, in addition, operated by a transmission grid operator.

A distribution grid, on the other hand, is provided for the distribution of electrical power. Generally speaking consumers are connected to a distribution grid, but generators are also connected, such as for example industrial plants and medium-sized power stations. Distribution grid segments are usually operated by a distribution grid operator.

Further graduations of the distribution grid are also known, such as, for example in Germany, the medium-voltage grid or the low-voltage grid.

As a result of malfunctions within the electrical energy supply grid, it can now happen that individual grid segments, or broad parts of the electrical supply grid, fail, i.e., no longer have any grid voltage (a "blackout"). A restoration of the grid is always required after such a grid failure.

As a starting point for restoring the grid, the grid operator usually first brings a generator that is capable of a black start into operation within his grid segment. In accordance with a schedule of the grid operator, consumers and further power stations are connected into the grid segment bit by bit, until the entire grid segment can again be operated properly.

In this classic grid restoration following a large-scale malfunction of a failed electrical supply grid, the transmission grid operator usually specifies to the distribution grid operator, at what time [in minutes] and with what magnitude [in +/−MW] a voltage segment should be switched in.

If regenerative generators are also connected to the voltage segment being switched in, it is possible that, following the connection of such a voltage segment, feeds that are hard to predict occur in some places, in particular as a result of unsteadiness in the generation by the regenerative generators.

In the extreme case, unwanted feedback into the voltage segment that has already been restored can even occur, so that, as a result of the excessive power in the voltage segment, it again fails or drops out.

In critical grid situations, the power generation of regenerative generators is for this reason lowered, in particular choked, and they are in addition excluded from the grid restoration, in particular in order to minimize to a large extent the influence of regenerative generators during the restoration of the grid.

It is problematic here that conventional power stations are not always available for the restoration of the grid, for example because of repair and/or servicing work. On top of this, in the context of the energy revolution, it is desirable for regenerative generators to be able to make a contribution to grid restoration.

BRIEF SUMMARY

Provided are techniques for enabling grid restoration independently of conventional power stations. Provided is a method for the provision of a requested real power to a transmission feed-in point of an electrical supply grid that connects electrically a first voltage segment to a second voltage segment, wherein the second voltage segment comprises at least one regenerative energy generator, in particular a wind power installation.

It is thus proposed that a requested real power is provided using at least one regenerative energy generator at a transmission feed-in point.

The transmission feed-in point here is a connecting point at which a first and a second voltage segment are connected to one another electrically. The transmission feed-in point can, for example, be arranged at a transformer that electrically connects the first and the second voltage segment.

The first and the second voltage segment are here preferably of three-phase design, and each have a grid voltage that is at least 10 kV. The first and the second voltage segment are, for example, designed vertically as a transmission grid segment and a distribution grid segment, or horizontally as two distribution grid segments.

The requested real power can, for example, be realized by a grid operator through a real power setpoint value or another real power specification—the generation of the requested real power takes place here through the regenerative generator of the second voltage segment.

In one preferred form of embodiment, the provision of the requested real power is performed by means of a windfarm that is configured to provide a windfarm power to the second voltage segment.

In a further preferred form of embodiment, the provision of the requested real power takes place in a grid restoration situation. A grid restoration situation here describes a situation in which an electrical restoration of the grid voltage of voltage segments of the electrical supply grid is necessary, for example following a blackout as described above.

In a first step of the method, the requested real power for the transmission feed-in point is now received.

It is thus in particular proposed that the requested real power is received as a target value of the real power, i.e., of the power value that should be set between the first and second voltage segments. This requested real power can also be referred to as the requested exchange power.

The grid operator of the first voltage segment can, for example, request a specified real power [in MW] at the transmission feed-in point at a specified time [in minutes] for the grid restoration with a setpoint value signal. The requested real power can, for this purpose, be received for example at a control room of a distribution grid operator or at a secondary power regulator of a grid segment, as an input magnitude.

Following this, in a second step, a real power band, with an upper band limit and a lower band limit, is applied. The upper band limit and the lower band limit are here disposed with an offset from the requested real power. The real power band furthermore comprises at least one control threshold value between the upper band limit and the lower band limit.

It is thus in particular proposed that a power band is placed or extended around the requested real power for control of the transmission power at the transmission feed-in point. The requested real power in megawatts can, for example, be disposed as a constant real power setpoint value $P_{req}$ in the center of the real power band between the upper band limit and the lower band limit.

The real power band is preferably specified or defined by a grid operator.

The real power band is thus, for example, specified by a transmission grid operator or by a distribution grid operator.

It is further also proposed that the two band boundaries each have an offset from the requested real power.

The upper band limit can, for this purpose, for example have a positive offset with respect to the requested real power, and the lower band limit a negative offset.

The offsets can, for example, be specified absolutely in megawatts or relatively in percent.

It is furthermore proposed that at least one control threshold value is disposed in the real power band between the upper band limit and the lower band limit.

The at least one control threshold value can, for example, be a threshold value that triggers an increase in the real power fed in by the at least one regenerative energy generator when the threshold is reached. Such a threshold value can also be referred to as a rise threshold value.

A plurality of control threshold values can, however, also be disposed within the real power band, for example three control threshold values.

A first control threshold value can thus, for example, be the previously described rise threshold value.

A second control threshold value can, for example, be a threshold value that triggers a reduction in the real power fed in by the at least one regenerative energy generator when the threshold is reached. Such a threshold value can be referred to as a fall threshold value.

A third control threshold value can, for example, be a threshold value that causes the real power fed in by the at least one regenerative energy generator to be held constant when the threshold is reached. Such a threshold value can be referred to as a constant threshold value.

In a further, subsequent, step, the at least one regenerative energy generator, in particular the windfarm, is controlled depending on the at least one control threshold value, in particular in order to provide the requested real power as transmission power at the transmission feed-in point.

It is in particular thus proposed that a change to the feed of the at least one regenerative energy generator is triggered by the at least one control threshold value.

Preferably the triggering of the at least one control threshold value occurs depending on an acquired transmission power at the transmission feed-in point. The transmission power at the transmission feed-in point can, for example, be acquired or determined through a measurement at the transmission feed-in point. The transmission power acquired in this way can to this extent also be understood as a trigger signal.

Through the method it is thus made possible for a grid operator to be able to freely specify the real power at the transmission feed-in point, or the exchange power with the defined real power band, when restoring a grid. The grid operator can thus switch loads in, and appropriate control units ensure that the real power band is complied with. It is furthermore possible to control the regenerative generators with the real power band in a controlled manner, whereby these can participate in the restoration of the grid.

It is furthermore particularly advantageous that the regenerative energy generators can ensure a grid restoration when uncoupled from conventional power stations.

The first voltage segment of the electrical supply grid preferably has a first nominal voltage and the second voltage segment of the electrical supply grid a second nominal voltage, wherein the first nominal voltage is greater than the second nominal voltage.

It is thus in particular proposed that the first voltage segment is disposed vertically with respect to the second voltage segment, and the second voltage segment, to which the regenerative energy generator or the windfarm is connected, has a lower nominal voltage.

Preferably the first nominal voltage is, for example, at least 110 kV or 220 kV or 380 kV. The first voltage segment is thus preferably designed as a transmission grid segment, and has a high voltage or a very high voltage.

In a further form of embodiment, the second rated voltage is preferably at least 10 kV or 110 kV. The second voltage segment is thus preferably designed as a distribution grid segment, and has a medium voltage or a high voltage.

A transformer is preferably arranged at the transmission feed-in point, wherein the transformer is configured to connect the first voltage segment and the second voltage segment together electrically.

It is thus in particular proposed that the voltage segments are connected to one another for power exchange via a transformer. The transformer is, for example, designed as a distribution grid or as a high-voltage transformer.

In a further preferred form of embodiment, the transformer is designed as a high-voltage transformer, in particular in order to connect voltage segments with different voltage levels or different nominal voltages together electrically.

The real power band is preferably received by a transmission grid operator.

It is thus in particular also proposed that the real power band is specified by a transmission grid operator and can, for example, be received via a grid control system.

Preferably the control of the at least one regenerative energy generator takes place depending at least on an acquired transmission power, wherein the transmission power is acquired at a (or the) transmission feed-in point.

It is also proposed that the transmission power is acquired or determined for the band control principle.

A measuring unit that is configured to determine the real power and its direction at the transmission feed-in point is for example arranged for this purpose at the transmission feed-in point. The measuring unit is, for example, designed as a multiphase power meter for this purpose. In addition or alternatively, the measuring unit can also, for example, be configured to perform a power flow calculation in order to calculate the real power at the transmission feed-in point.

Particularly preferably, the transmission power at the transmission feed-in point is acquired by a distribution grid operator.

In one preferred form of embodiment, a (or the) acquired transmission power is used as a trigger signal for triggering the at least one control threshold value.

Preferably the respective offset of the upper band limit and the lower band limit from the requested real power is a relative offset related to the requested real power.

It is thus in particular proposed that the offset of the band limits is formed as a relative value that is, for example, specified by a grid operator as a percentage value related to the requested real power. The relative value can, for example, be positive or negative, for example +/−5%, +/−00% or +/−15% of the requested real power.

It is advantageous to a relative offset that the band limits are automatically adjusted to the value of the requested real power.

Preferably the offset of the upper band limit and the lower band limit from the requested real power is additionally or as an alternative an absolute offset related to the requested real power.

It is thus in particular proposed that the offset of the band limits is formed as an absolute value that is, for example, specified by a grid operator in the form of a power value related to the requested real power. The absolute value can thus be positive or negative, for example +/−10 MW, +/−20 MW, or +/−50 MW.

An absolute offset is advantageous in that it can be defined independently of the requested real power, and this can be adjusted to a (or the) reserve available at the time.

Mixed forms are also, however, possible, for example a relative upper band limit and an absolute lower band limit.

The upper band limit and the lower band limit can, moreover, also have a different offset from the requested real power.

The respective offset of the upper band limit and the lower band limit can preferably each comprise a minimum offset in relation to the requested real power, which is preferably formed as an absolute value.

Such a minimum offset, defined as an absolute value, can here be referred to as an absolute minimum offset. The absolute minimum offset can be positive or negative, for example +/−5 MW, +/−12.5 MW, or +/−25 MW.

It is advantageous for the minimum offset that the security when restoring the grid is increased.

Preferably, the offset of the upper band limit is a predetermined positive offset or a predetermined negative offset from the requested real power.

Such a positive or negative offset can here be referred to as a positive offset or a negative offset.

It is thus in particular proposed that the maximum real power at the transmission feed-in point is limited, in particular by an upper band limit that limits the maximum real power at the transmission feed-in point.

In a further form of embodiment it is also proposed that the minimum real power at the transmission feed-in point is limited, in particular by a lower band limit that limits the minimum real power at the transmission feed-in point.

The limitation of the transmission power at the transmission feed-in point can thus, for example, be performed by the grid operator through the specification of a corresponding upper band limit or lower band limit.

It is advantageous here that the grid operator can specify or limit the maximum or minimum flow of real power in an easy manner.

Preferably the positive or the negative offset is an offset in a range of values of at least 3% to 6% of a conventional installed power coupled to the second voltage segment, or is a line with a provision of an instantaneous reserve.

The conventional installed power here describes the total of the nominal powers of all the conventional energy generators that are connected to the second voltage segment. The conventional installed power here is usually known to a grid operator.

Preferably, renewable energies and/or stores that exhibit frequency support properties, i.e., all those generators that are configured and provided to participate in the provision of an instantaneous reserve, can also be understood as conventional energy generators.

The positive or negative offset can, however, also be an offset with a range of values from 40% to 60% or 60% to 80% of the requested real power. The range of values can, however, also lie between 0.5% and 10%, depending on the size of the grid segment, for example 2 GW nominal power.

Preferably the real power band has an adjustable real power bandwidth, wherein the real power bandwidth is a sum of the magnitudes of the offsets of the upper band limit and the lower band limit from the requested real power.

It is thus in particular also proposed that the bandwidth of the real power band is adjustable.

Particularly preferably the real power bandwidth is at least 10 MW, in particular at least 25 MW or at least 50 MW.

Preferably the real power band is changed during ongoing operation.

It is thus in particular also proposed that the real power band is changed in a grid establishment situation.

In one preferred form of embodiment, the real power band is at least changed by an enlargement or reduction of a real power bandwidth, a change in the offset of the upper band limit, a change in the offset of the lower band limit and/or a shift of the real power band by a predetermined offset factor.

It is thus in particular proposed that the band limits, or the real power bandwidth, are adjusted individually to the grid situation during ongoing operation.

It is also proposed that an offset factor is provided with which the position of the real power band can be changed around the requested real power.

It is accordingly advantageous that a facility is provided with which it is possible to adjust the real power band to the individual grid establishment situation during ongoing operation.

The change to the real power band takes place particularly preferably depending on a reception of an external change signal. The external change signal can here, for example, be received from a transmission grid operator or a distribution grid operator. The external change signal can here also be conceived of as an instruction that is given by a grid operator in the context of his prerogative to the owner of a generator or of a consumer.

In a further form of embodiment, the change to the real power band is made depending on a stability parameter of the electrical supply grid.

A stability parameter of the electrical supply grid here expresses how strongly the grid reacts to a change of a parameter that has an influence on the voltage segment.

A stability parameter can, for example, be a grid sensitivity that indicates how a nominal voltage of the second voltage segment changes depending on a changed reactive power feed into the second voltage segment (GS=$\Delta V/\Delta Q$), or how a nominal frequency of the second voltage segment changes depending on a changed real power feed into the second voltage segment (GS=$\Delta f/\Delta P$).

The stability parameter can, for example, also be a short-circuit current ratio.

The short-circuit current ratio, also known as the SCR (short-circuit ratio) refers to the ratio of the short-circuit power to the connected power.

In a further form of embodiment, the change to the real power band takes place depending on a number of regenerative energy generators coupled to the second voltage segment.

In a further form of embodiment, the change to the real power band is made depending on a total installed power in the electrical supply grid.

The total installed power here describes the total maximum nominal power of the installed generators of a grid segment.

In a further form of embodiment, the change to the real power band takes place depending on a number and size of the loads that are to be connected to the second voltage segment.

In a further form of embodiment, the change to the real power band takes place depending on the grid operators currently switched in, i.e., in particular distribution grid operators who connect in loads and adjust the power again with the regenerative generation.

A load that is to be switched in can here, for example, be a further distribution grid segment or a consumer such as, for example, an industrial plant.

It is thus in particular also proposed that the change to the real power band is changed on the basis of the criteria described above.

The change preferably takes place here automatically.

The real power band is, for example, widened when this is requested by the external change signal received from a transmission grid operator, or it is widened the more stable the voltage segment is, the greater the number of coupled regenerative energy generators is, the greater the total installed power is, the greater the total synchronous inertia is or the more loads to be switched in there are and the greater the magnitude of these loads.

A faster and more secure grid restoration is enabled by taking such influencing factors into consideration.

Preferably, a control threshold value is a rise threshold value described above or below.

It is thus in particular also proposed that a threshold value is provided that triggers an increase in the feed of real power into the second voltage segment of the regenerative energy generator.

Thus if, for example, 5 MW are requested at the transmission feed-in point by a transmission grid operator, the rise threshold value is also 5 MW.

The rise threshold value is preferably provided to trigger an increase in the feed of real power of the at least one regenerative energy generator if the rise threshold value is reached positively.

Triggering a threshold value, or the rise threshold value, with a positive switching edge is here referred to as reached positively. The rise threshold value can, for example, be stored for this purpose in a control unit that is configured to generate a control signal for an increase in the real power feed of the regenerative energy generator depending on the rise threshold value.

It is advantageous here that a simple facility is provided for a grid operator to initiate an increase in the real power feed, namely when there is an adequate offset from the upper band limit and the lower band limit.

Preferably a control threshold value is a fall threshold value described above or below.

It is thus in particular also proposed that a threshold value is provided that triggers a reduction in the real power fed into the second voltage segment of the regenerative energy generator.

Thus if, for example, −2.5 MW is received has the lower band limit from a transmission grid operator, the fall threshold value is also −2.5 MW.

The fall threshold value is preferably provided to trigger a reduction in the feed of real power of the at least one regenerative energy generator if the fall threshold value is reached negatively.

Triggering a threshold value, or the fall threshold value, with a negative switching edge is here referred to as reached negatively. The fall threshold value can, for example, be stored for this purpose in a control unit that is configured to generate a control signal for a reduction in the real power feed of the regenerative energy generator depending on the fall threshold value.

It is advantageous here that a simple facility is provided for a grid operator for triggering a reduction in the real power feed.

Preferably a control threshold value is a constant threshold value described above or below.

It is thus in particular proposed that a threshold value is provided that causes the real power fed into the second voltage segment of the regenerative energy generator to be held constant.

The constant threshold value is preferably provided to cause the feed of real power of the at least one regenerative energy generator to be held constant if the constant threshold value is reached negatively.

Triggering the constant threshold value with a negative switching edge is here referred to as reached negatively. The constant threshold value can, for example, be stored for this purpose in a control unit that is configured to generate a control signal to hold the real power feed of the regenerative energy generator constant depending on the constant threshold value.

It is advantageous here that a simple facility is provided for a grid operator to cause the real power feed to be held constant in order not to change a real-power-dependent state or working point of the second voltage segment.

A feed signal is preferably generated depending on the respective control threshold value when the respective control threshold value is reached, wherein the feed signal is specified to at least one controllable regenerative energy generator for controlling the real power feed, in particular in order to increase, to reduce or to hold constant the real power fed in by the controllable regenerative energy generator.

It is thus in particular also proposed that if one of the previously described control threshold values is reached, a feed signal assigned to the threshold value is generated which then is specified to a controllable regenerative energy generator. The feed signal is thus a control signal for controlling the feed of the regenerative energy generator.

The controllable regenerative energy generator here is a regenerative energy generator that is configured to receive the feed signal and to change its real power feed depending on the received control signal.

In addition or as an alternative, it is preferably proposed that a switch-in signal is generated depending on the respective control threshold value when the respective control threshold value is reached, wherein the switch-in signal is specified to at least one regenerative energy generator that can be switched in to control the real power feed, in particular in order to switch the regenerative energy generator that can be switched in into the second voltage segment or to switch it out.

It is thus in particular also proposed that if one of the previously described control threshold values is reached, a switch-in signal assigned to the threshold value is generated which then is specified to a regenerative energy generator that can be switched in. The switch-in signal is thus a control signal for controlling the feed by coupling or decoupling the regenerative energy generator to the second voltage segment.

The regenerative energy generator that can be switched in here is a regenerative energy generator that is configured to receive the switch-in signal and, depending on the received signal, to be electrically coupled into or decoupled from the second voltage segment by means of a switching device.

Preferably a (or the) requested real power and/or the real power band is specified by a grid operator.

A transmission grid operator can for this purpose for example generate the setpoint value of the real power in a control center and transmit it via a grid control system to a control center of the distribution grid operator, for example via LAN or WAN.

In one preferred form of embodiment, the requested real power is specified as a real power setpoint value by a transmission grid operator, for example by the transmission grid operator of the first voltage segment.

In a further preferred form of embodiment it is proposed that the requested real power is specified by a grid operator as a real power setpoint value that is constant over time or takes the form of a ramp.

It is particularly advantageous here that a simple facility is provided for the grid operator to be able to implement an individual specification of the real power setpoint value to which the regenerative energy generators adapt their feed. The real power setpoint value, and thereby also the exchange power band, can, for example, remain constant if the transmission grid operator (TGO) does not require any additional feed, is brought up in the form of a ramp if the TGO requires less feed, or lowered in the form of a ramp when the TGO requires more feed.

Preferably the at least one control threshold value is changed during ongoing operation.

In a further form of embodiment, the control threshold value is changed during ongoing operation through an enlargement or reduction in the rise threshold value, through an enlargement or reduction in the fall threshold value, or through an enlargement or reduction of the constant threshold value.

It is thus in particular proposed that at least one threshold value is changed.

It is advantageous here that a facility can be provided to a grid operator of being able to continuously adapt the threshold values of the real power band to the individual grid establishment situation.

In one preferred form of embodiment, the change in the at least one control threshold value takes place depending on reception of an external change signal, depending on a stability parameter of the electrical supply grid, depending on a number of regenerative energy generators coupled to the second voltage segment, depending on a total installed power in the supply grid, depending on a total synchronous inertia in the supply grid, or depending on a number and size of loads that are to be switched into the second voltage segment, in particular as described above.

Preferably, the control of the at least one regenerative energy generator depending on the at least one control threshold value comprises the further step of: defining a limited real power feed against time for the at least one regenerative energy generator, wherein the defined real power feed is defined as:

$$P_{reg} = k \cdot P_{out} / T_{int},$$

wherein k is a limiting factor, $P_{out}$ is an output power of the at least one regenerative energy generator, and $T_{int}$ is a predetermined time interval.

It is thus in particular proposed that the real power feed of the at least one regenerative energy generator cannot be increased or reduced arbitrarily quickly when, for example, the rise or fall threshold value is triggered. The real power feed is thus limited by the limiting factor k and the predetermined time interval $T_{int}$.

Preferably the limiting factor k has a value of less than 1.

In a further form of embodiment, the limiting factor k lies in a range between 0.2 to 0.4, 0.4 to 0.6, or 0.6 to 0.8.

Preferably the limiting factor k is changed during ongoing operation.

In one preferred form of embodiment, the limiting factor k is changed in ongoing operation, in particular depending on a primary regulation rate of conventional energy generators that are coupled to the second voltage segment.

In a further preferred form of embodiment it is proposed in addition or as an alternative that the limiting factor k is varied in ongoing operation depending on a fluctuation following a power run.

A power run here describes a start-up and subsequent shutdown of the second voltage segment, in particular to discover how the voltage segment reacts.

Preferably the predetermined time interval $T_{int}$ is less than 10 minutes.

In one preferred form of embodiment, the predetermined time interval $T_{int}$ is less than 5 minutes, less than 1 minute, or less than 30 seconds.

A power regulator, in particular a secondary power regulator, that connects a first voltage segment to a second voltage segment electrically is proposed for the provision of a requested real power at a transmission feed-in point of an electrical supply grid, wherein the second voltage segment comprises at least one regenerative energy generator.

The power regulator comprises at least one receiving apparatus for receiving the requested real power for the transmission feed-in point, and a band control unit, wherein the band control unit is configured to use a real power band with an upper band limit and a lower band limit, each of which is arranged with an offset from the requested real power, wherein the real power band has at least one control threshold value between the upper band limit and the lower band limit, wherein the band control unit is configured to control the at least one regenerative energy generator, in particular a windfarm, depending on the at least one control threshold value with a control signal, in particular in order to provide the requested real power as transmission power at the transmission feed-in point.

It is thus in particular proposed that the power regulator comprises at least one reception apparatus for receiving the requested real power for the transmission feed-in point, and a band control unit, wherein the band control unit is configured to use a real power band and to control at least one regenerative energy generator depending on at least one control threshold value.

In a further form of embodiment, the power regulator is a secondary power regulator.

A secondary power regulator here is a power regulator that is provided as a control unit in an electrical supply grid and is configured to regulate the total of all the real power(s) that flow between horizontally coupled voltage segments to zero.

The secondary power regulator thus ensures an appropriate balance within the grid segments that it must regulate.

Preferably the power regulator is configured to carry out a method according to one of the above forms of embodiment.

Furthermore, a windfarm for providing a requested real power to a transmission feed-in point of an electrical supply grid that electrically connects a first voltage segment to a second voltage segment is proposed.

The windfarm here comprises at least one farm control unit that is configured to receive a control signal from a higher-level power regulator and to specify an installation control signal, a plurality of wind power installations that are configured to each generate a wind power installation power depending on the received control signal, at least one installation transformer for the transmission of the generated wind power installation power into an electrical farm grid, wherein the farm grid is connected via a farm transformer to the second voltage segment in order to feed the wind power installation power of the wind power installations as windfarm power into the second voltage segment depending on the received control signal.

The windfarm accordingly comprises at least one farm control unit, a plurality of wind power installations, at least one installation transformer and a farm grid.

In a further form of embodiment, the farm control unit is a windfarm regulator for the control of real and reactive power.

In a further form of embodiment, the installation transformers are configured to transform an input voltage into an output voltage, wherein the installation transformers preferably transform an alternating voltage generated by the wind power installations, in particular in a voltage range from 500 V up to 5 kV, into a farm grid voltage, in particular in the voltage range from 5 kV to 50 kV.

In a further form of embodiment, the farm grid is a three-phase alternating voltage grid, preferably having a farm grid voltage of at least 5 kV, the farm grid voltage is in particular between 10 kV and 20 kV.

In one preferred form of embodiment, the farm transformer is a medium-voltage transformer or a high-voltage transformer.

It is thus in particular also proposed that the wind power installations are connected electrically to the supply grid via the farm grid, in order to be able to feed the wind power installation powers of the wind power installations as windfarm power into the electrical supply grid depending on the received control signal of the higher-level power regulator.

The farm control unit is preferably configured to carry out a method as described above or below.

A wind power installation for providing a requested real power to a transmission feed-in point of an electrical supply grid that electrically connects a first voltage segment to a second voltage segment is proposed.

The wind power installation here comprises at least one installation control unit that is configured to receive a control signal from a higher-level controller, preferably from a higher-level power regulator and/or from a farm control unit, and a feed device that is configured to provide and to feed into a farm grid a wind power installation power depending on the received control signal.

The wind power installation accordingly comprises at least one installation control unit and a feed device.

In a further form of embodiment, the installation control unit is designed as a wind power installation regulator that is configured to communicate with a higher-level SCADA (supervisory control and data acquisition) system or with a grid control system.

In a further form of embodiment, the feed device is designed as a controllable full converter.

Preferably the installation control unit receives a control signal from the previously described power regulator and/or from the previously described farm control unit of the windfarm.

BRIEF DESCRIPTION OF THE SEVERAL VIEWS OF THE DRAWINGS

The present invention will now be explained in more detail below by way of example with reference to exemplary embodiments in the light of the accompanying figures, wherein the same reference signs are used for identical or similar assemblies.

DETAILED DESCRIPTION

Figure 1:
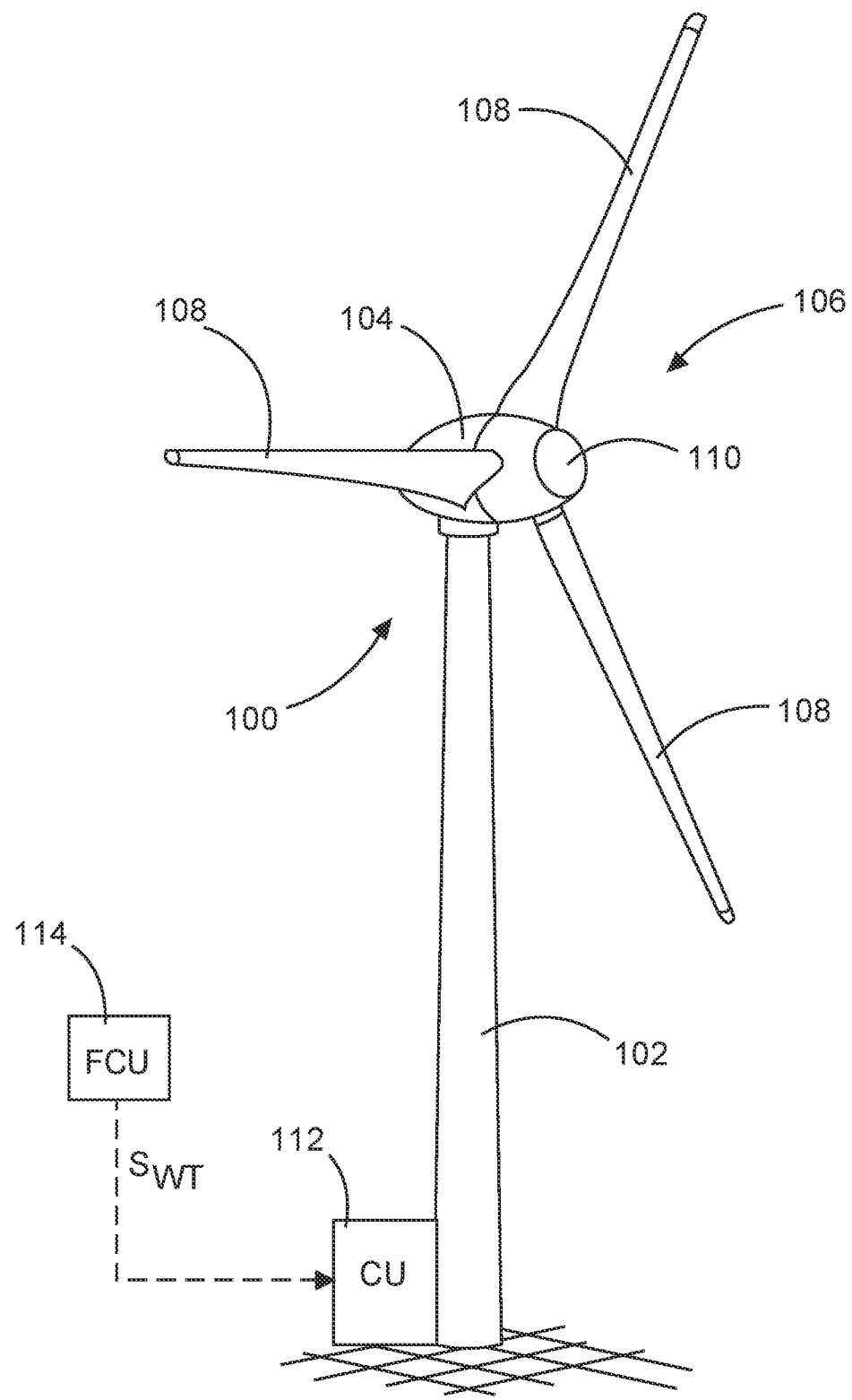
FIG. 1 shows schematically a perspective view of a wind power installation in one form of embodiment.
Figure 2:
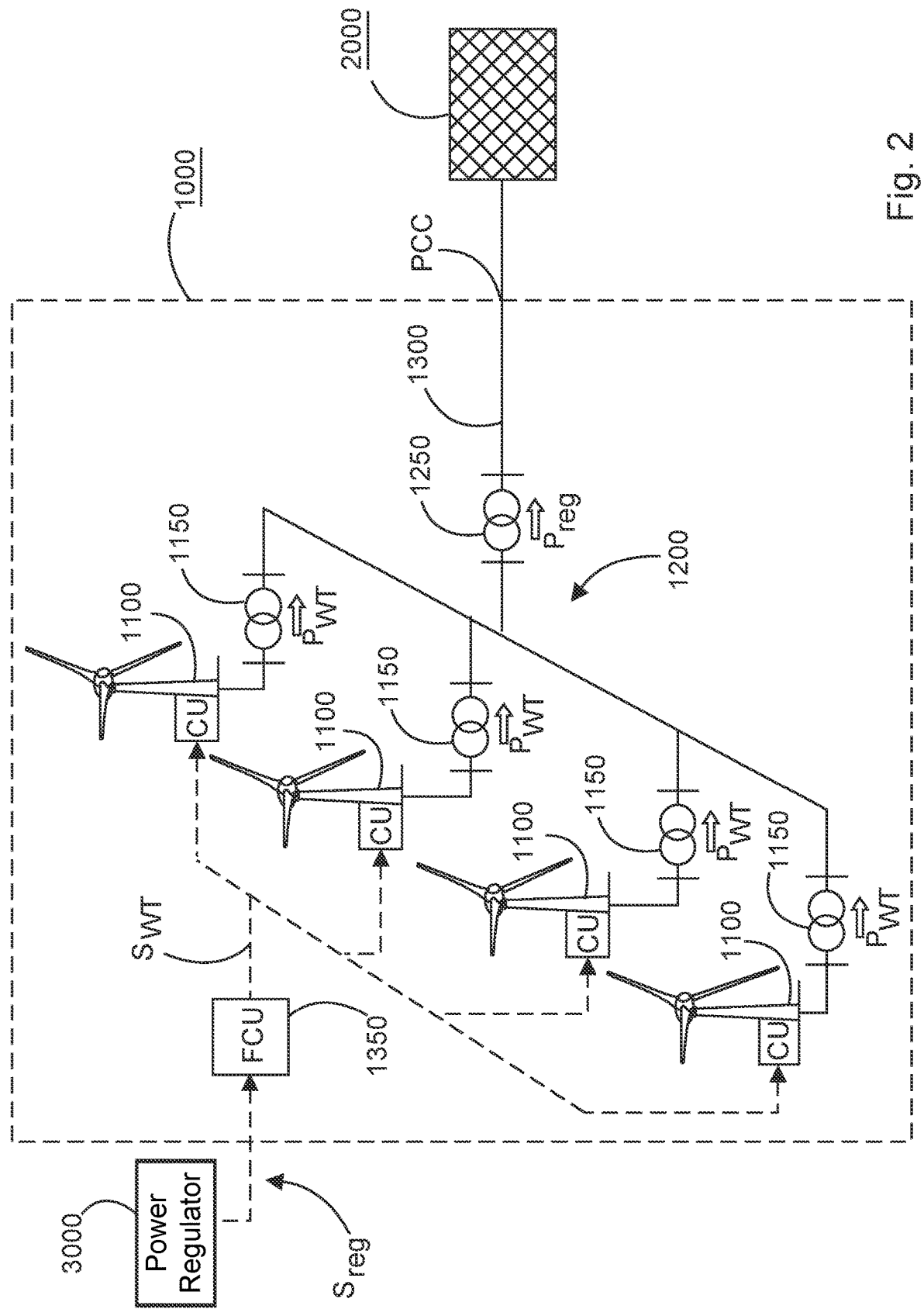
FIG. 2 shows schematically a structure of a regenerative power generator in one form of embodiment.

FIG. 1 shows a perspective view of a wind power installation 100 for the provision of a requested real power in one form of embodiment which, for example, is part of a windfarm, as for example shown in FIG. 2.

The wind power installation 100 comprises for this purpose a tower 102 and a nacelle 104. An aerodynamic rotor 106 with three rotor blades 108 and a spinner 110 is arranged at the nacelle 104. The rotor 106 when operating is set into rotary movement by the wind, thereby driving a generator in the nacelle 104. The generator hereby generates a current which, by means of a full converter that operates in a current-forming manner, is supplied to a wind power installation transformer that is connected to a windfarm grid.

The wind power installation 100 furthermore comprises an installation control unit 112 (installation controller) that is configured to receive an installation control signal $S_{WT}$ from a higher-level controller 114, preferably from a farm control unit FCU.

The installation control unit 112 is, for example, designed as a "control unit" CU, and controls the wind power installation 100, preferably depending on the received installation control signal $S_{WT}$.

The installation control unit 112 is, particularly preferably, configured to carry out and/or to participate in a method for the provision of a requested real power as described above or below.

The wind power installation 100 further comprises a feed device for feeding a wind power installation power $P_{WT}$ preferably to a full converter as described above or below.

The feed device is furthermore configured to feed the wind power installation power $P_{WT}$ into a farm grid, preferably depending on the received installation control signal $S_{WT}$.

FIG. 2 shows in one form of embodiment a schematic structure of a regenerative energy generator, namely a windfarm 1000, for the provision of a requested real power. The regenerative energy generator 1000 is, for example, part of an electrical supply grid 2000, as shown for example in FIG. 3.

Figure 3:
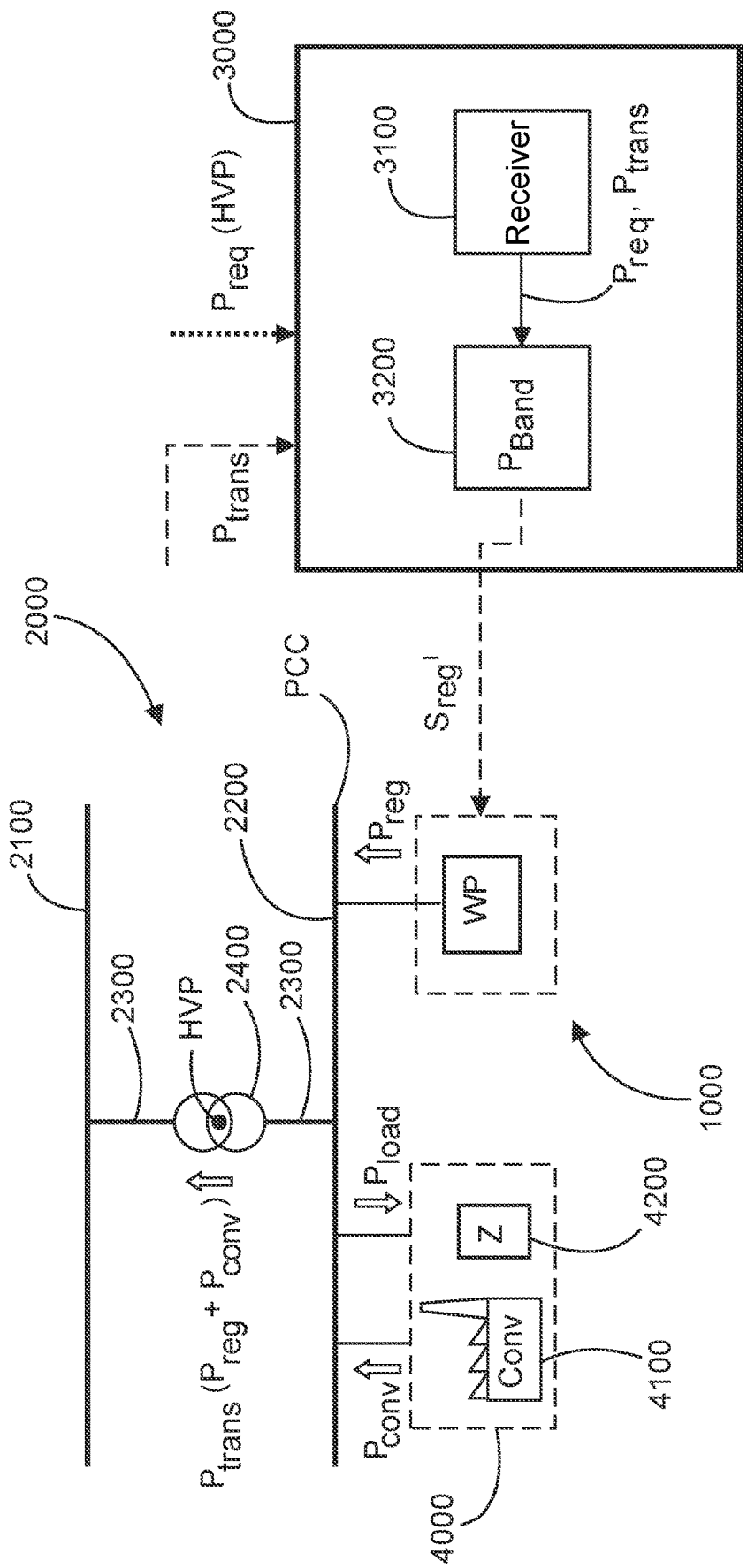
FIG. 3 shows schematically a structure of an electrical supply grid in which a requested real power $P_{req}$ is made available with a real power band.

The windfarm 1000 feeds a windfarm power $P_{reg}$ at a grid connection point PCC into the electrical supply grid 2000, and is preferably controlled by a power regulator 3000, as shown for example in FIG. 3.

For generating the windfarm power $P_{reg}$, the windfarm 1000 comprises a plurality of wind power installations 1100, in particular four wind power installations, preferably as shown in FIG. 1.

The wind power installations 1100 generate a wind power installation power $P_{WT}$, each of which is fed via an installation transformer 1150 into an electrical farm grid 1200, and added there to the windfarm power $P_{reg}$.

The farm grid 1200 itself connects the installation transformers 1150 together electrically, and is also connected at the grid connection point PCC to the electrical supply grid 2000 by means of a connecting line 1300 comprising a windfarm transformer 1250.

The windfarm 1000 furthermore comprises a farm control unit (FCU) 1350 provided for control of the windfarm power $P_{reg}$. The farm control unit 1350 is thus configured to control the individual wind power installations 1100 of the windfarm 1000.

The farm control unit 1350 for example controls the wind power installation power $P_{WT}$ of the wind power installations 1100 depending on the received control signal $S_{reg}$ of the power regulator 3000.

The farm control unit 1350 further preferably also controls the wind power installation power $P_{WT}$ of the wind power installations 1100 through the specification of an installation control signal $S_{WT}$ that is specified in each case to an installation control unit CU of the wind power installations 1100.

The farm control unit 1350 is further preferably configured to carry out a method as above or below for the provision of a requested real power with a real power band, or to participate in such a method.

FIG. 3 shows schematically a structure of an electrical supply grid 2000 with at least one regenerative energy generator 1000 that is controlled by a power regulator 3000.

The electrical supply grid 2000 here comprises a first voltage segment 2100 and a second voltage segment 2200.

The first voltage segment 2100 and the second voltage segment 2200 are connected together electrically for the exchange of power at a transmission feed-in point HVP by means of a transmission transformer 2400 and a transmission line 2300.

The transmission transformer 2400 is here configured for the transmission of a transmission power $P_{trans}$ between the first voltage segment 2100 and the second voltage segment 2200, and preferably transmits the transmission power $P_{trans}$ from the second voltage segment 2200 into the first voltage segment 2100 and vice versa.

To generate the transmission power $P_{trans}$, the electrical supply grid 2000 comprises at least one controllable regenerative energy generator 1000, for example a windfarm as is shown in FIG. 2, along with further grid participants, for example further generators 4100 such as conventional power stations, and consumers 4200, such as for example households or blast furnaces.

The generators 4100 are electrically connected here for the feed of a power $P_{conv}$ to the second voltage segment 2200, and are preferably designed as conventional power stations.

The consumers 4200 are electrically connected to the second voltage segment 2200 to draw a power $P_{load}$, and can, for example, be referred to as grid load.

The controllable, regenerative energy generator 1000 is further connected electrically at a grid connection point PCC to the second voltage segment 2200 for feeding in an electrical power $P_{reg}$.

The regenerative energy generator 1000 is preferably a windfarm WP, such as is shown for example in FIG. 2.

To control the regenerative energy generator 1000, the electrical supply grid 2000 comprises a power regulator 3000 that is configured to control the regenerative energy generator 1000 with a control signal $S_{reg}$, as described above or below.

The power regulator 3000 comprises a receiving device 3100 (receiver) and a band control unit 3200 (controller) for this purpose.

The receiving device 3100 is configured for receiving the requested real power $P_{req}$ that is to be set as the transmitted power $P_{trans}$ at the transmission feed-in point. The requested real power $P_{req}$ for the transmission feed-in point is for example received for this purpose via a grid control system from a grid operator as the real power setpoint value $P_{req}$.

The receiving device 3100 is preferably also configured for receiving an acquired transmission power $P_{trans}$ at the transmission feed-in point, which is for example measured at the transmission feed-in point or calculated for the transmission feed-in point.

The band control unit 3200 is furthermore configured for the generation of a control signal $S_{reg}$ that is specified to the regenerative energy generator 1000.

To generate the control signal $S_{reg}$, the band control unit 3200 uses a real power band $P_{band}$, as described above or below.

The real power band $P_{band}$ is implemented for this purpose depending on the requested real power $P_{req}$ in the band control unit 3200, for example a control program.

The regenerative energy generator 1000 thus changes the power $P_{reg}$ that it feeds in depending on the control signal $S_{reg}$.

The power regulator 3000 thus controls the power $P_{reg}$ of the regenerative energy generator 1000 fed into the second voltage segment 2200 with a real power band $P_{band}$ that is implemented in the power regulator 3000.

The power $P_{reg}$ that is fed in here is preferably a real power.

The power regulator 3000 is in addition particularly preferably configured to carry out a method as above or below for the provision of a requested real power.

Figure 3A:
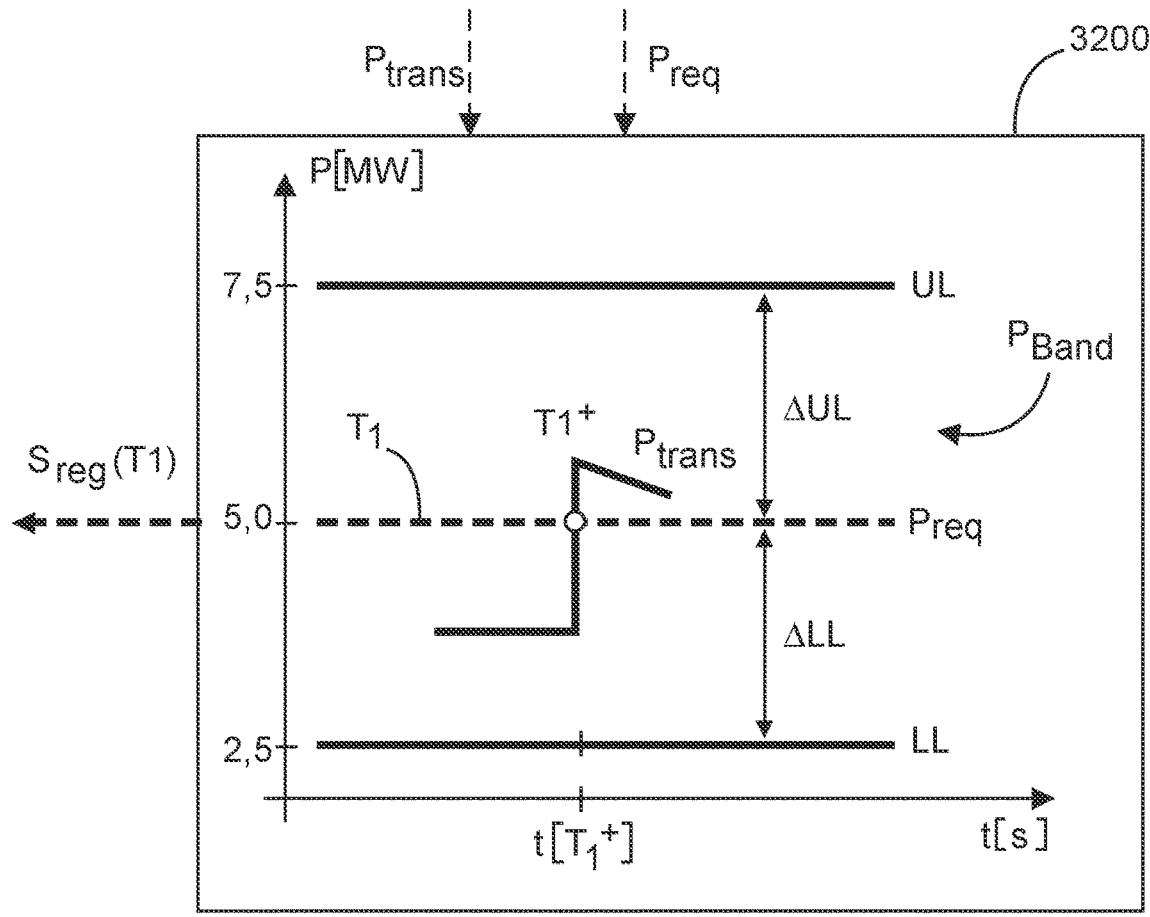
FIG. 3A shows schematically a band control principle with a real power band in one form of embodiment.

The control principle of the real power band $P_{band}$ is described in the supplementary FIG. 3A.

FIG. 3A shows schematically the control principle with a real power band $P_{band}$ in a supplementary form of embodiment that is, for example, implemented in the band control unit 3200 of the power regulator 3000, as shown in FIG. 3.

The real power band $P_{Band}$ here comprises an upper band limit UL and a lower band limit LL.

The upper band limit UL and the lower band limit LL are here each disposed at an offset ΔUL, ΔLL from the requested real power $P_{req}$.

The requested real power $P_{req}$=5 MW and ΔUL is for example disposed as a positive, absolute offset with ΔUL=2.5 MW above $P_{req}$, and ΔLL is disposed as a negative, relative offset with ΔUL=−50%·$P_{req}$=−2.5 MW below $P_{req}$. In this example, the upper band limit UL and the lower band limit LL are accordingly specified as UL=7.5 MW and LL=2.5 MW.

The real power band $P_{Band}$ further comprises at least one control threshold value T1 between the upper band limit UL and the lower band limit LL of the requested real power $P_{req}$.

The control threshold value T1 triggers an increase in the real power $P_{reg}$ fed in of the at least one regenerative energy generator 1000 when the threshold value T1 is reached positively. The control threshold value T1 can also be referred to as a rise threshold value.

To control the regenerative energy generator 1000, the transmission power $P_{trans}$ is acquired, for example at the transmission feed-in point, and made available to the band control unit 3200.

The transmission power $P_{trans}$ provided can then be received by the band control unit 3200 and used as a trigger signal in order to trigger the rise threshold value T1.

The acquired transmission power $P_{trans}$ is illustrated in segments as a continuous signal in a Cartesian coordinate system in FIG. 3A, in which the real power P is plotted in megawatts on the y-axis and the time t in seconds on the x-axis.

Up until the time t<t(T1$^+$) the transmission power $P_{trans}$ at the band control unit does not reach the rise threshold value T1.

At time t=t(T1$^+$) the transmission power $P_{trans}$ reaches the rise threshold value T1 as a result of a real power increase at the HVP, whereupon the band control unit 3200 generates the control signal $S_{reg}$(T1).

The increase in the transmission power $P_{trans}$ at the time t(T1$^+$) can, for example be traced back to the connection of a generator or distribution grid segment to the second voltage segment in a grid establishment situation.

The control signal $S_{reg}$(T1) is thus generated, depending on the rise threshold value T1, for the control of at least one regenerative energy generator 1000, as is shown in FIGS. 2 and 3.

The real power $P_{Band}$, which depends on the requested real power $P_{req}$, is thus used to control the at least one regenerative energy generator 1000 depending on the rise threshold value T1 with a control signal $S_{reg}$, preferably in a grid establishment situation.

Figure 4:
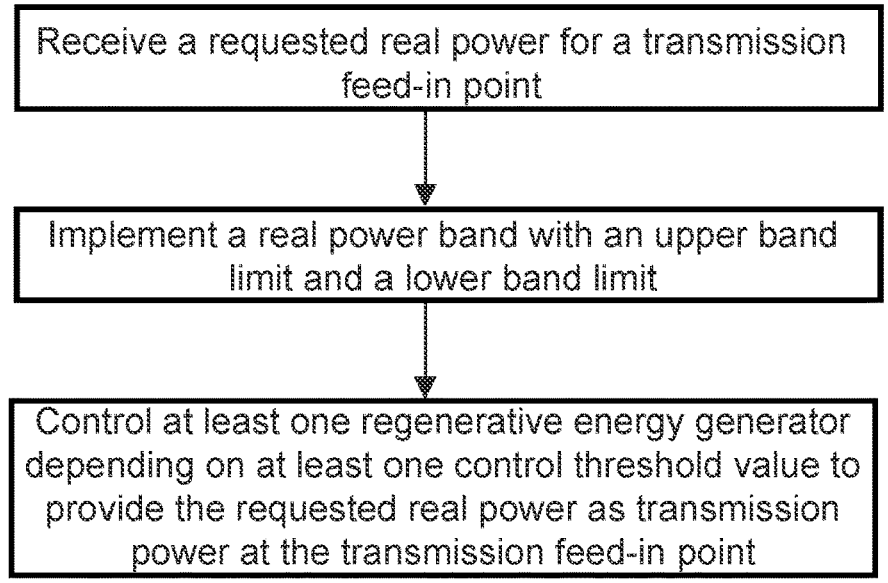
FIG. 4 shows schematically a process flow of the method in one form of embodiment.

FIG. 4 shows schematically a process flow of the method for the provision of a requested real power $P_{req}$ at a transmission feed-in point (HVP) in one form of embodiment.

The requested real power $P_{req}$ is provided at a transmission feed-in point of an electrical supply grid that connects a first voltage segment electrically to a second voltage segment. The second voltage segment here comprises at least one regenerative energy generator, for example a windfarm as shown in FIG. 2.

In a first step S1 the requested real power for the transmission feed-in point is received, for example as a setpoint value signal from a transmission grid operator. The requested real power is, for example, received from a power regulator that is arranged in the second voltage segment.

Following this, a real power band with an upper band limit and a lower band limit is used or implemented in a second step S2. The real power band can, for example, be implemented in a power regulator, as shown for example in FIG. 3, with defined band limits, band offsets and a control threshold value T1 as a control program in a band control unit.

The band limits of the real power band are here each disposed with an offset from the requested real power, wherein the real power band comprises at least one control threshold value between the upper band limit and the lower band limit.

In a next step S3 at least one regenerative energy generator, for example a windfarm as shown in FIG. 2 or 3, is controlled, depending on the at least one control threshold value, in order to provide the requested real power as transmission power at the transmission feed-in point HVP.

Figure 5A:
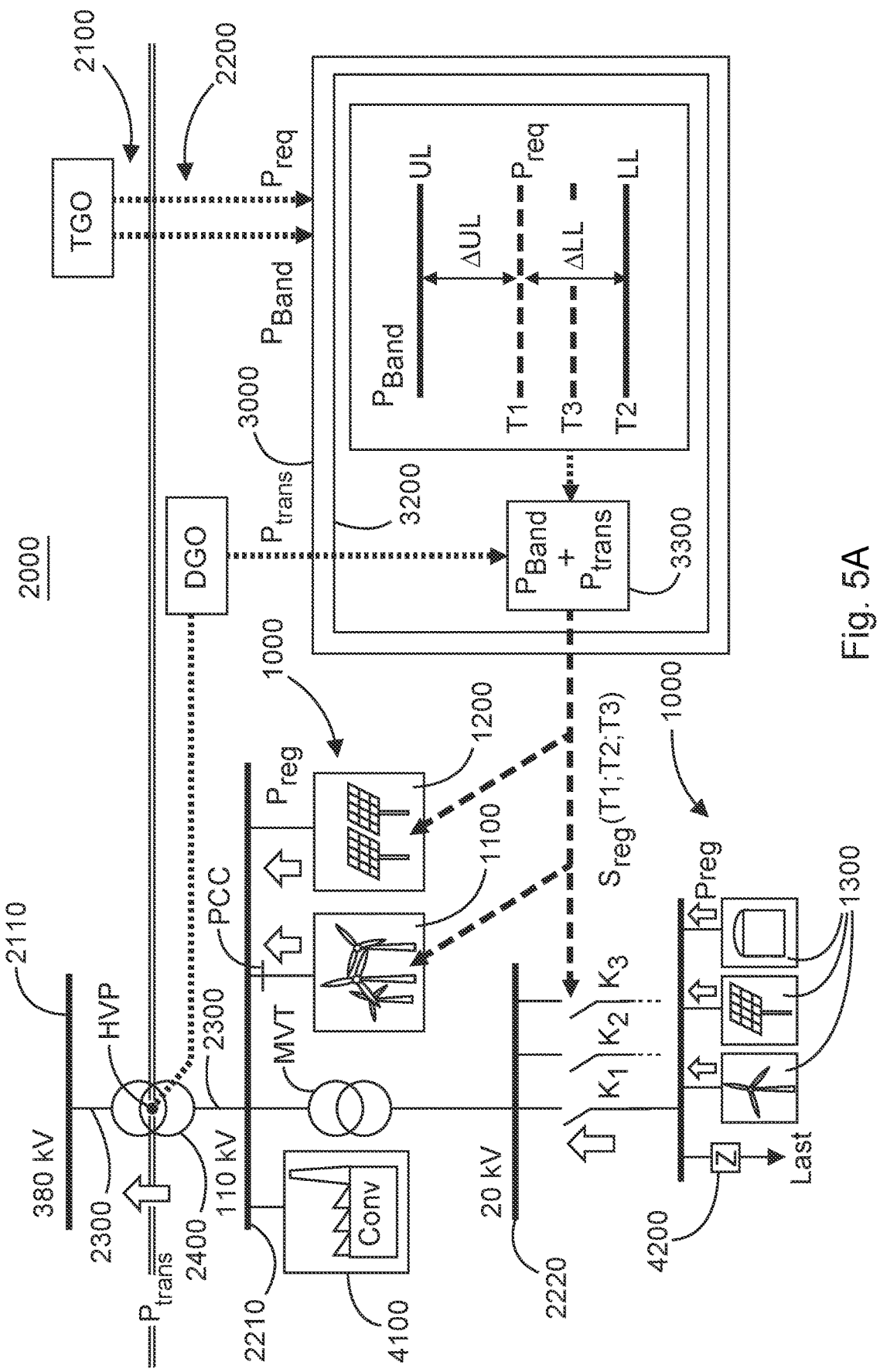
FIG. 5A shows schematically a structure of an electrical supply grid with a band control principle in a further form of embodiment.

FIG. 5A shows schematically a structure of an electrical supply grid 2000, similar to that shown in FIG. 3, with a power regulator 3000 that uses a real power band, in particular in a further, preferred form of embodiment.

The first voltage segment 2100 and the second voltage segment 2200 are here arranged vertically, namely as a transmission grid segment and a distribution grid segment.

The transmission grid segment 2100 here comprises a 380 kV very high-voltage level 2110, and is operated by a transmission grid operator TGO.

The distribution grid segment 2200 here comprises a 110 kV high-voltage level 2210, and a 20 kV medium-voltage level 2220, and is operated by a distribution grid operator (DGO).

The transmission grid segment 2100 and the distribution grid segment 2200 are connected together electrically for exchange of the transmission power $P_{trans}$ via a high-voltage transformer 2400 and a transmission line 2300. The transmission power $P_{trans}$ can thus be transferred from the distribution grid segment 2200 into the transmission grid segment 2100 or, conversely, from the transmission grid segment 2100 into the distribution grid segment 2200.

The 110 kV high-voltage level 2210 and a 20 kV medium voltage level 2220 of the distribution grid segment are connected together electrically via a medium-voltage transformer MVT.

The distribution grid segment 2200 further comprises electrical consumers and generators, namely a conventional power station 4100 that is connected to the 110 kV voltage level 2210 and grid loads 4200 that are connected to the 20 kV voltage level 2220.

To generate the transmission power $P_{trans}$, the distribution grid segment 2200 comprises a plurality of regenerative energy generators 1000, for example a windfarm 1100, a solar power farm 1200, and a plurality of uncontrolled, regenerative small generators 1300.

The transmission power $P_{trans}$ is thus generated in the distribution grid segment 2200.

The supply grid 2000 further comprises a secondary power regulator 3000 for control of the regenerative energy generators 1100, 1200 and 1300 with a control signal $S_{reg}$.

The secondary power generator is configured here to control the windfarm 1100 and the solar power farm 1200 with a feed signal. The windfarm 1100 and the solar power farm 1200 can thus be identified as controllable regenerative energy generators.

The secondary power generator 3000 is, moreover, configured to control the switching in or switching out of the uncontrolled regenerative small generators 1300 with a switch-in signal.

The distribution grid segment 2200 comprises switching means K1, K2, K3 for this purpose, which are configured to be controlled by the switch-in signal. Uncontrolled regenerative energy generators are electrically coupled to the switching means, and can be switched in to the 20 kV voltage level 2220 for an increase in the real power or shed for a reduction in the real power. The uncontrolled regenerative energy generators 1300 can thus be referred to as switchable energy generators.

For control of the regenerative energy generators 1100, 1200 and 1300, the secondary power regulator 3000 receives a requested real power $P_{req}$ as well as a predefined real power band $P_{Band}$ from the transmission grid operator TGO, which specifies the band limits UL and LL as well as three control threshold values T1, T2 and T3.

The control threshold value T1 is designed as a rise threshold value, the control threshold value T2 is designed as a fall threshold value and the control threshold value T3 is designed as a constant threshold value. The requested real power $P_{req}$ is received via a grid control system as the real power setpoint value together with the predefined real power band $P_{band}$.

The secondary power regulator 3000 also receives a transmission power $P_{trans}$ at the HVP that is measured by a distribution grid operator VNB.

The secondary power regulator 3000 then generates the control signals $S_{reg}(T1)$, $S_{reg}(T2)$, or $S_{reg}(T3)$ for control of the regenerative energy generators 1100, 1200 and 1300, depending on the control threshold values T1, T2 and T3 that initiate the corresponding control signal depending on the acquired transmission power. For this purpose it is preferred that each control signal $S_{reg}(T1)$, $S_{reg}(T2)$, or $S_{reg}(T3)$ is assigned to one control threshold value T1, T2 or T3, and is stored as the control program in the function block 3300 in the band control unit.

Figure 5B:
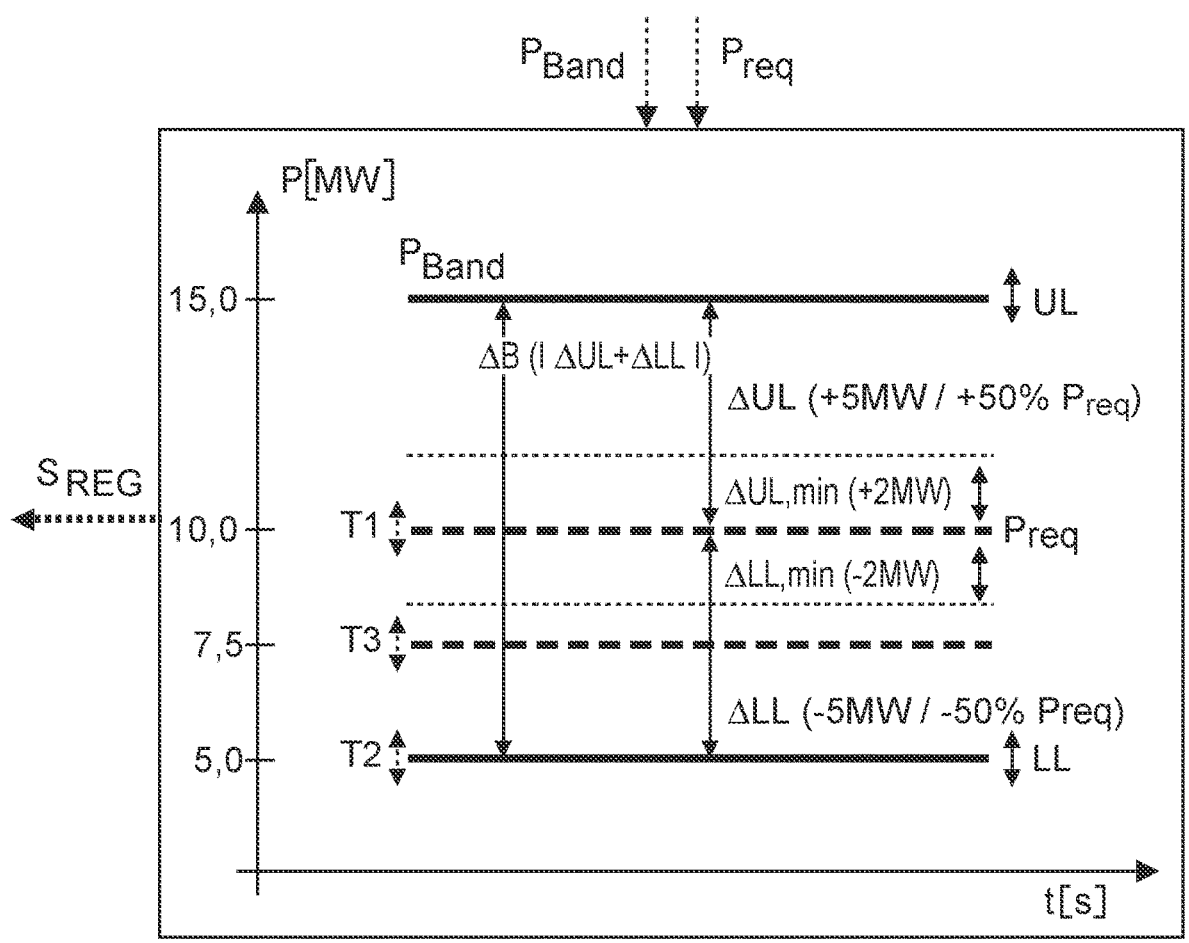
FIG. 5B shows schematically a real power band in a further form of embodiment.

FIG. 5B shows schematically a real power band $P_{Band}$ in a further form of embodiment, and provides a supplementary explanation of the control threshold values T1, T2 and T3 that are shown in FIG. 5A.

The real power band $P_{Band}$ has, in particular in comparison with the real power band $P_{Band}$ that is shown in FIG. 3A, a minimum offset $\Delta UL_{,min}$ and $\Delta LL_{,min}$ in relation to the requested real power $P_{req}$. The minimum offset is, for example, +/−2 MW, and is shown dotted.

The real power band $P_{Band}$ furthermore comprises an upper band limit UL and a lower band limit LL, each of which can be changed during ongoing operation. This is illustrated by the double arrows at the band limits.

The real power band $P_{Band}$ further comprises three control threshold values T1, T2 and T3.

The first control threshold value T1 is a rise threshold value that corresponds to the requested real power $P_{req}$, for example 10 MW.

The second control threshold value T2 is a fall threshold value that corresponds to the lower band limit LL, 5 MW for example.

The third threshold value T3 is a constant threshold value that corresponds to a predetermined value between the requested real power $P_{req}$ and the lower band limit LL, 7.5 MW for example.

The control threshold values T1, T2 and T3 of the real power band $P_{Band}$ are here changeable during ongoing operation. This is illustrated by the double arrows at the threshold values.

The real power band $P_{Band}$ further comprises a specifiable real power bandwidth AB whose magnitude is the sum of the magnitudes of the offsets ($\Delta B=|\Delta UL|+|\Delta LL|$) of the upper band limit and the lower band limit, and is, for example, 20 MW.

Figure 6A:
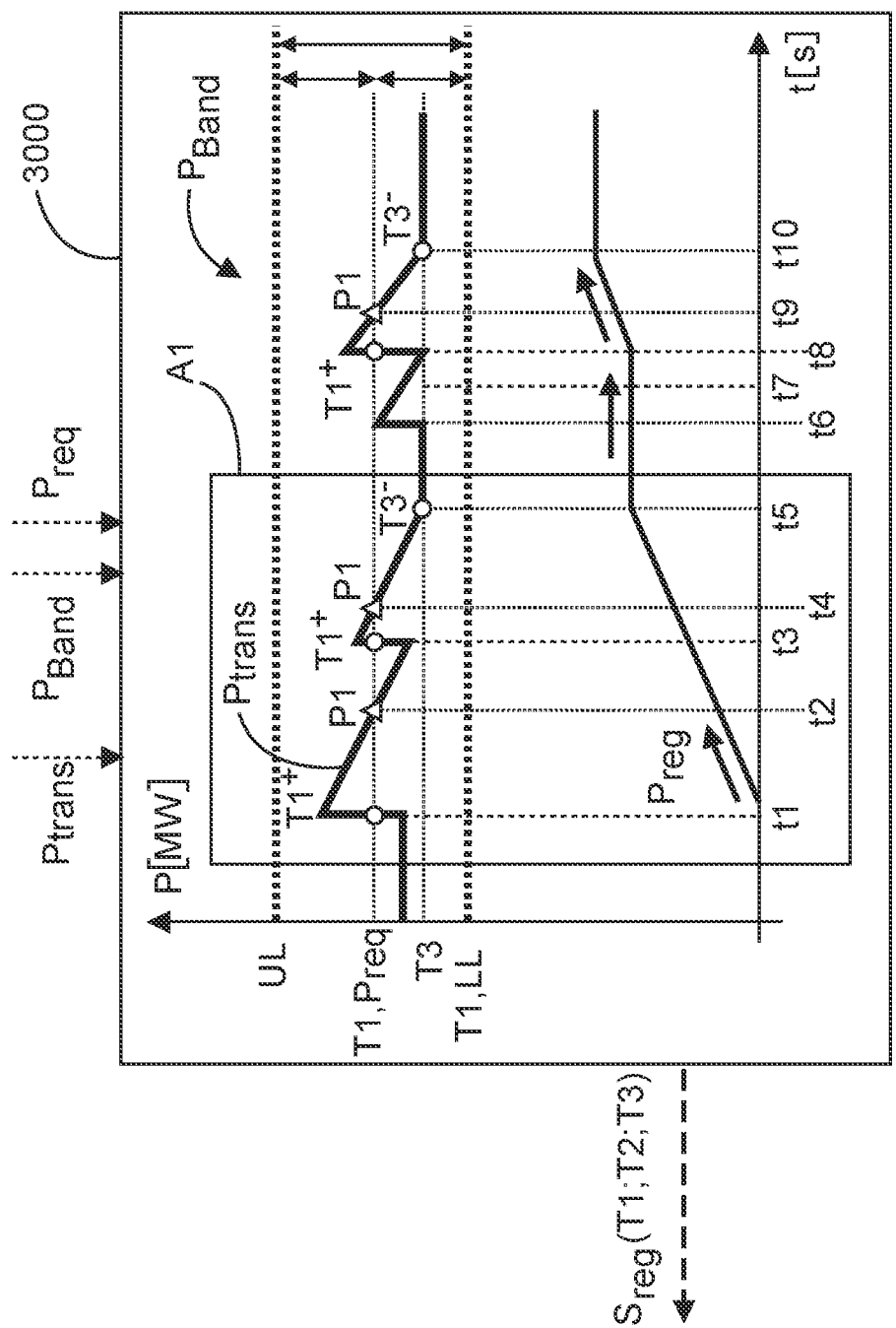
FIG. 6A shows schematically a control principle with a real power band in a further form of embodiment.

FIG. 6A shows schematically the control principle with a real power band $P_{Band}$ in a further form of embodiment, in particular as the control principle is implemented in the power regulator 3000 in FIG. 5A, particularly preferred as at section A1.

In particular it is shown how the feed or the generated power $P_{reg}$ of the at least one regenerative energy generator changes depending on the control threshold values T1, T2 and T3.

The power regulator 3000 illustrated first receives the real power band $P_{Band}$ together with the requested real power $P_{req}$, for example from a transmission grid operator, as shown in FIG. 5A.

The real power band $P_{Band}$ here comprises an upper band limit UL and a lower band limit LL, as well as three control threshold values T1, T2 and T3, in particular as shown in FIG. 5B.

The control threshold value T1 triggers an increase in the power $P_{reg}$ fed in of the at least one regenerative energy generator when this is reached positively. T1 is thus triggered by a positive switching edge of the acquired transmission power $P_{trans}$. The threshold value T1 is thus a rise threshold value, and triggers the control signal $S_{reg}(T1)$.

The control threshold value T2 triggers a reduction in the power $P_{reg}$ fed in of the at least one regenerative energy generator when this is reached negatively. T2 is thus triggered by a negative switching edge of the acquired transmission power $P_{trans}$. The threshold value T2 is thus a fall threshold value, and triggers the control signal $S_{reg}(T2)$.

The control threshold value T3 causes the power $P_{reg}$ fed in of the at least one regenerative energy generator to be held constant when this is reached negatively. T3 is thus triggered by a negative switching edge of the acquired transmission power $P_{trans}$. The threshold value T3 is thus a constant threshold value, and triggers the control signal $S_{reg}(T3)$.

The power regulator 3000 also receives an acquired transmission power $P_{trans}$ that is in particular acquired by a distribution grid operator, as shown for example in FIG. 5A.

The acquired transmission power $P_{trans}$ is illustrated here in segments as a continuous signal in a Cartesian coordinate system, in which the real power P is plotted in megawatts on the y-axis and the time t in seconds on the x-axis.

The acquired transmission power $P_{trans}$ initiates the control threshold values T1, T2 and T3 as trigger signals.

The switching points of the acquired power $P_{trans}$ with a control threshold value T1, T2 or T3, are illustrated as circles. The switching points each trigger a control signal $S_{reg}(T1; T2; T3)$. The intersections of the acquired power $P_{trans}$ with a threshold value T1, T2 or T3, are also illustrated as triangles. The intersections do not trigger a change in the feed. The control threshold values T1, T2 and T3 are thus triggered depending on the direction of the acquired transmission power $P_{trans}$.

The change to the real power feed $P_{reg}$ of the regenerative energy generator depending on the three threshold values T1, T2 and T3 is here illustrated as an exemplary graphical curve underneath the real power band $P_{Band}$.

At time $t_1$, the acquired transmission power $P_{trans}$ jumps as a result of a load being switched in, for example by a load being switched in at the distribution grid segment 2200 as shown, for example, in FIG. 5A.

The transmission power $P_{trans}$ then triggers the rise threshold value T1 with a positive switching edge at the point T1$^+$. The control signal $S_{reg}$(T1) is accordingly generated by the power regulator 3000 and specified to the at least one regenerative energy generator as a control signal $S_{reg}$(T1).

At the time $t_1$, the at least one regenerative energy generator thereupon starts to increase its fed power $P_{reg}$ in the form of a ramp. This is illustrated by an upward-pointing arrow in the graphical curve of the real power feed $P_{reg}$.

An increase in the fed power $P_{reg}$ of the at least one regenerative energy generator thus has the effect that the transmission power $P_{trans}$ falls at the transmission feed-in point. In particular, as a result of the increased power fed in $P_{reg}$ of the at least one regenerative energy generator, more real power is generated in the distribution grid segment, and thus less transmission power $P_{trans}$ is exchanged at the transmission feed-in point.

The power $P_{reg}$ fed in does not change at time $t_2$, since the rise threshold value T1 is reached negatively rather than positively. The increase is accordingly still retained.

The feed $P_{reg}$ also does not change at time $t_3$, since an increase was already triggered at time $t_1$. The jump in the transmission power $P_{trans}$ at time $t_3$ can, for example, be traced back to a further load being switched in at the distribution grid segment.

The feed is retained at time $t_4$ analogously to time $t_2$.

At time $t_5$, the threshold value T3 is reached negatively, which causes the real power feed $P_{reg}$ of the at least one regenerative energy generator to be held constant with a control signal $S_{reg}$(T3). This is illustrated by an arrow pointing to the right in the graphical curve of the real power feed $P_{reg}$.

Holding the fed power $P_{reg}$ of the at least one regenerative energy generator constant thus has the effect that the transmission power $P_{trans}$ at the transmission feed-in point remains constant.

A load is switched in again at time $t_6$.

The following intersection P1 at time $t_9$ and the switching point T3 at time $t^{10}$ operate analogously to the times $t_2$ and $t_4$ or $t_5$.

FIG. 6A further illustrates that the real power feed $P_{reg}$ of the at least one regenerative energy generator is retained until another control threshold is triggered.

Figure 6B:
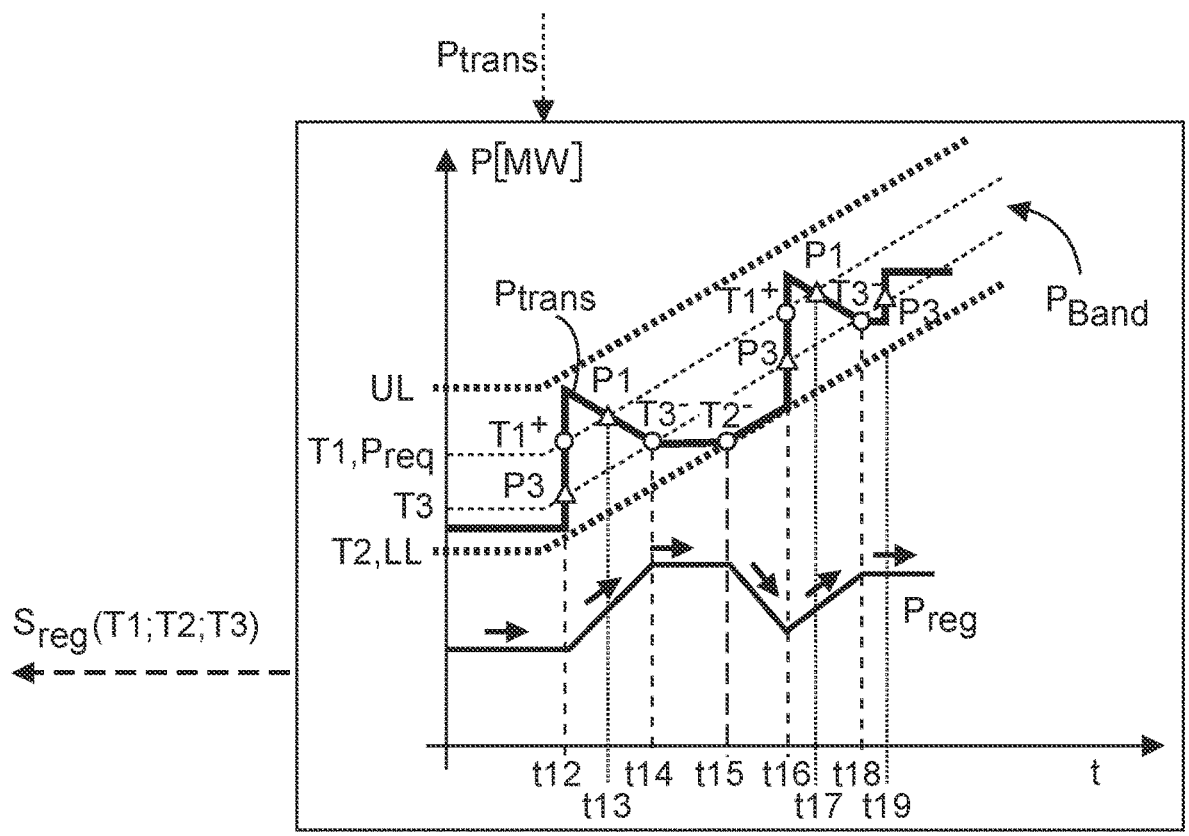
FIG. 6B shows schematically a control principle with a real power band in a further form of embodiment.

FIG. 6B shows a further form of embodiment of the control principle, with a real power band $P_{Band}$, and expands in particular on FIG. 6A.

At time $t_{12}$, or following time $t_{12}$, the requested real power $P_{req}$ is specified by the grid operator, for example by the transmission grid operator of the transmission grid 2100, as a real power setpoint value increasing as a ramp over time, as shown in FIG. 5A.

The real power band $P_{Band}$ thus follows the requested real power $P_{req}$, since the band limits UL and LL, as well as the control threshold values, are specified in relation to the requested real power $P_{req}$.

At times $t_{12}$, $t_{14}$, $t_{16}$ and $t_{18}$ an increase, or a holding constant, of the real power $P_{reg}$ fed in from the at least one regenerative energy generator is triggered, in particular as described previously in relation to FIG. 6A.

At time $t_{15}$, the control threshold value T2 is reached negatively, which initiates a reduction of the real power feed $P_{reg}$ of the at least one regenerative energy generator with a control signal $S_{reg}$(T2). This is illustrated by a downward-pointing arrow in the graphical curve of the real power feed $P_{reg}$.

A reduction in the fed power $P_{reg}$ of the at least one regenerative energy generator thus has the effect that the transmission power $P_{trans}$ rises at the transmission feed-in point. In particular, as a result of the reduced power fed in $P_{reg}$ of the at least one regenerative energy generator, less real power is generated in the distribution grid segment, and thus more transmission power $P_{trans}$ is exchanged or drawn from the transmission grid at the transmission feed-in point.

Figure 6C:
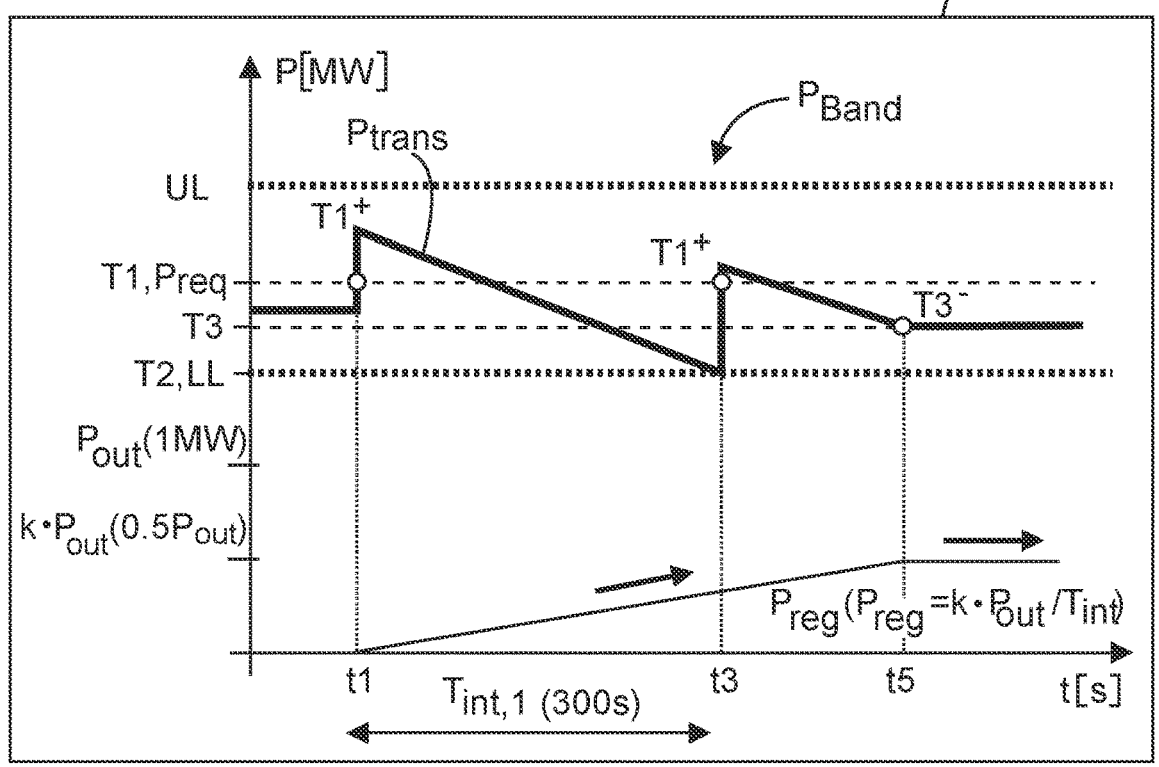
FIG. 6C shows schematically a control principle with a real power band in a further form of embodiment.

FIG. 6C shows the band control principle with a real power band $P_{Band}$ in a further form of embodiment in which the real power feed $P_{reg}$ is limited, and expands in particular on FIG. 6A.

To this end, FIG. 6C enlarges the section A1 of FIG. 6A.

At time $t_1$, the control threshold value T1 is reached positively, which initiates an increase in the real power feed $P_{reg}$ of the at least one regenerative energy generator with a control signal $S_{reg}$(T3), in particular as described before in relation to FIG. 6A.

A limited real power feed $P_{reg}$ per unit of time is defined here for the at least one regenerative energy generator, wherein the specified real power feed $P_{reg}$ is defined as:

$$P_{reg} = k * P_{out} / T_{int}$$

Here k is a limiting factor, $P_{out}$ is an output power of the at least one regenerative energy generator, and $T_{int}$ is a predetermined time interval.

As can be seen from the curve of the graph underneath the real power band $P_{Band}$, the real power feed $P_{reg}$ is limited by a limiting factor of k=0.5 for $T_{int}$=300 s, that is to $P_{reg}$=0.5 MW.

It is thus in particular proposed that the regenerative energy generator is limited, although it is designed to feed a higher output power $P_{out}$ of, for example, $P_{out}$=1 MW.

Figure 7:
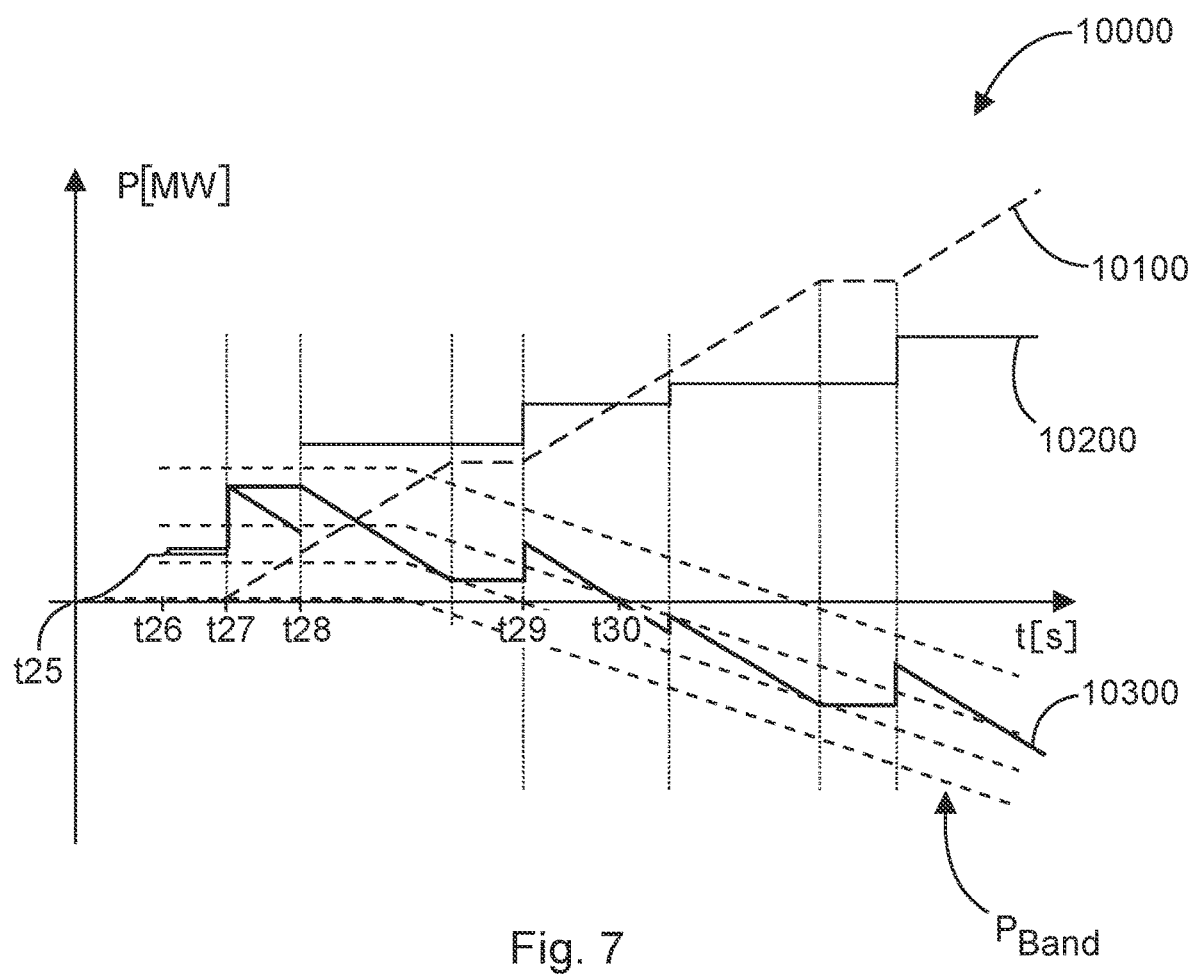
FIG. 7 shows schematically a control principle with a real power band in a further form of presentation.

FIG. 7 shows schematically a control principle with a real power band in a further form of presentation 10000.

The form of presentation 10000 shows the curve of the powers, in particular of the regenerative feed 10100 controlled by means of the method described above or below, the supplied load in the distribution grid 10200, and the exchange power 10300 against time.

The illustrated case relates in particular to lessening the load of the transmission grid, i.e., a removal of load from the power stations at the transmission grid, or the addition of load to another distribution grid. The intention here is the transfer of power from one distribution grid to another distribution grid.

The real power band $P_{Band}$ described above or below is placed around the exchange power 10300.

The method is performed here as described above or below.

The total of the controlled regenerative feed 10100 and the exchange power 1300 here corresponds to the power of the supplied load 10200.

A distribution grid is switched in at time t25.

The exchange band $P_{Band}$ is activated at time t26.

The regenerative feed is subsequently increasingly raised, starting at time t27.

Switching in loads, for example at times t27, t28, t29, initially has the effect that more power is required at the time. This power is first made available through the exchange power 10300, and replaced over time by regenerative power 10100.

At time t30 the distribution grid is then able to supply itself entirely regeneratively, and can, for example, provide further power as exchange power to other distribution grids (illustrated by the exchange power in the negative quadrants).

The band control principle can thus be advantageously employed in order to control windfarms and groupings of windfarms in a voltage segment or grid region.

It is in addition possible to control the windfarms and groupings of windfarms in combination with other controllable generators, loads and storage systems.

A few advantages are obtained in this way, which are summarized below as key points:

- simplification of the operational control of grids in critical situations and where there is a high number of regenerative energy generators in the voltage segment;
- in comparison with manual grid operation in critical grid situations, the combination of an automatic feed control of the regenerative energy generators with a feed signal, and an automatic or manual switching in of loads of uncontrolled energy generators or grid loads with a switch-in signal, enables the fast (partially) automatic restoration of supply;
- a load tracking mode of operation can, by conveying a relative setpoint value deviation (modification of $P_{req}$ to $P_{trans}$), be used in other critical grid situations; and
- the band control principle can also be used to increase the load on power stations or reduce the load of renewable energy generators in order to ensure the technical minimum load of large power stations.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing a requested real power as a transmission power at a transmission feed-in point of an electrical supply grid that electrically connects a first voltage segment to a second voltage segment, wherein the second voltage segment includes at least one regenerative energy generator, the method comprising:
   receiving the requested real power that is requested at the transmission feed-in point; and
   controlling the transmission power at the transmission feed-in point using a real power band, the real power band having:
      an upper band limit and a lower band limit each being at a respective offset from the requested real power, and
      at least one control threshold value between the upper band limit and the lower band limit;
   wherein controlling the transmission power at the transmission feed-in point includes controlling the at least one regenerative energy generator depending on whether the at least one control threshold value has been reached or exceeded to provide the requested real power as the transmission power at the transmission feed-in point.

2. The method as claimed in claim 1, wherein:
   the first voltage segment of the electrical supply grid has a first nominal voltage,
   the second voltage segment of the electrical supply grid has a second nominal voltage, and
   the first nominal voltage is greater than the second nominal voltage, wherein the first nominal voltage is at least 110 kilovolts (kV) and the second nominal voltage is at least 10 kV.

3. The method as claimed in claim 1, wherein a transformer is arranged at the transmission feed-in point, wherein the transformer is configured to electrically connect the first voltage segment and the second voltage segment.

4. The method as claimed in claim 1, comprising:
   receiving the real power band from a transmission grid operator.

5. The method as claimed in claim 1, comprising:
   measuring, by a distribution grid operator, the transmission power at the transmission feed-in point; and
   controlling the at least one regenerative energy generator depending on the measured transmission power.

6. The method as claimed in claim 1, wherein the respective offsets of the upper band limit and the lower band limit from the requested real power are relative offsets relative to the requested real power.

7. The method as claimed in claim 1, wherein the respective offsets of the upper band limit and the lower band limit are each associated with a minimum offset in relation to the requested real power, wherein each minimum offset is at least 5 megawatts (MW).

8. The method as claimed in claim 1, wherein the respective offset of the upper band limit is a predefined positive offset from the requested real power in a range of:
   40% to 60% of the requested real power; or
   60% to 80% of the requested real power.

9. The method as claimed in claim 1, wherein the respective offset of the lower band limit is a predefined negative offset from the requested real power in a range of:
   40% to 60% of the requested real power; or
   60% to 80% of the requested real power.

10. The method as claimed in claim 1, wherein the real power band has a real power bandwidth that is predefinable, wherein the real power bandwidth is a sum of magnitudes of the respective offsets of the upper band limit and the lower band limit from the requested real power, and wherein the real power bandwidth is at least 10 MW.

11. The method as claimed in claim 1, comprising:
   changing the real power band during operation by performing at least one change from a list of changes including:
   an increase or reduction of a real power bandwidth;
   a change in the respective offset of the upper band limit;
   a change in the respective offset of the lower band limit; and
   a shift of the real power band by an offset factor depending on at least one of a list of dependencies including:
      a reception of an external change signal;
      a stability parameter of the electrical supply grid, wherein the stability parameter expresses a strength in a reaction of the electrical supply grid to a change of a parameter that has an influence on the first voltage segment or the second voltage segment;
      a number of regenerative energy generators coupled to the second voltage segment;

a total installed power in the first voltage segment and/or in the second voltage segment of the electrical supply grid;
a total synchronous inertia in the first voltage segment and/or in the second voltage segment of the electrical supply grid; and
a number and size of loads that are to be switched into the second voltage segment.

12. The method as claimed in claim 1, further comprising:
triggering an increase in a real power of the at least one regenerative energy generator that is fed in when an upper threshold value of the requested real power is reached.

13. The method as claimed in claim 1, further comprising:
triggering a reduction in a real power of the at least one regenerative energy generator that is fed in when a lower threshold value of the requested real power is reached.

14. The method as claimed in claim 1, wherein:
the at least one control threshold value is a threshold value associated with a predefined value between the requested real power and the lower band limit.

15. The method as claimed in claim 12, comprising:
when the at least one control threshold value is reached, generating a feed signal depending on the at least one control threshold value, and wherein the feed signal is configured for the at least one regenerative energy generator for controlling a real power feed of the at least one regenerative energy generator, and/or
when the at least one control threshold value is reached, generating a switch-in signal depending on the at least one control threshold value, and wherein the switch-in signal is configured for the at least one regenerative energy generator, and the at least one regenerative energy generator is switched into the second voltage segment or out of the second voltage segment to control real power generation.

16. The method as claimed in claim 1, comprising:
specifying, by a grid operator, the requested real power;
specifying, by a transmission grid operator of the first voltage segment, the requested real power as a real power setpoint value;
specifying, by the transmission grid operator of the first voltage segment, the requested real power as the real power setpoint value that is constant over time or follows a ramp curve; or
specifying, by the transmission grid operator of the first voltage segment, the real power band, the upper band limit, the lower band limit or the at least one control threshold value.

17. The method as claimed in claim 1, comprising:
changing the at least one control threshold value during operation by performing at least one change from a list of changes including:
an increase or reduction of an upper threshold value;
an increase or reduction of a lower threshold value; and
an increase or reduction of a constant threshold value; or
changing the at least one control threshold value during operation depending on at least one of a list of dependencies including:
a reception of an external change signal;
a stability parameter of the electrical supply grid, wherein the stability parameter expresses a strength in a reaction of the electrical supply grid to a change of a parameter that has an influence on the first voltage segment or the second voltage segment;
a number of regenerative energy generators coupled to the second voltage segment;
a total installed power in the first voltage segment and/or in the second voltage segment of the electrical supply grid;
a total synchronous inertia in the first voltage segment and/or in the second voltage segment of the electrical supply grid; and
a number and size of loads that are to be switched in to the second voltage segment.

18. The method as claimed in claim 1, wherein the controlling the at least one regenerative energy generator depending on the at least one control threshold value includes:
specifying a limited real power feed per unit of time for the at least one regenerative energy generator, wherein the specified limited real power feed is defined as:

$$P_{reg} = k * P_{out} / T_{int}$$

wherein k is a limiting factor, $P_{out}$ is an output power of the at least one regenerative energy generator, and $T_{int}$ is a predetermined time interval.

19. The method as claimed in claim 18, wherein the limiting factor is less than 1 and in a range of one of:
0.2 to 0.4;
0.4 to 0.6; and
0.6 to 0.8.

20. The method as claimed in claim 18, comprising:
changing the limiting factor during operation depending on a primary regulation rate of counter-regulating conventional energy generators that are coupled to the second voltage segment; and/or
changing the limiting factor during operation depending on a fluctuation following a power run.

21. The method as claimed in claim 18, wherein the predetermined time interval is less than 10 minutes, less than 5 minutes, less than 1 minute and/or less than 30 seconds.

22. A power regulator that is a secondary power regulator for providing a requested real power as a transmission power at a transmission feed-in point of an electrical supply grid, comprising at least:
a receiver configured to receive the requested real power at the transmission feed-in point, the transmission feed-in point electrically connects a first voltage segment to a second voltage segment, the second voltage segment including at least one regenerative energy generator; and
a controller configured to:
operate using a real power band having an upper band limit and a lower band limit each being at a respective offset from the requested real power, the real power band having at least one control threshold value between the upper band limit and the lower band limit; and
output a control signal to control the at least one regenerative energy generator depending on whether the at least one control threshold value has been reached or exceeded to cause the requested real power to be provided as the transmission power at the transmission feed-in point.

23. A windfarm for providing a requested real power at a transmission feed-in point of an electrical supply grid that electrically connects a first voltage segment to a second voltage segment, comprising:
a farm controller configured to receive a control signal from a higher-level power regulator and determine an installation control signal;

a plurality of wind power installations that are each configured to receive the installation control signal and generate an installation power depending on the installation control signal; and at least one installation transformer configured to transfer the generated installation power into an electrical farm grid, wherein the electrical farm grid is connected to the second voltage segment via a farm transformer, and the electrical farm grid is configured to feed the installation power of the plurality of wind power installations as windfarm power into the second voltage segment;

wherein the farm controller is configured to control a transmission power at the transmission feed-in point using a real power band having an upper band limit and a lower band limit each being at a respective offset from the requested real power and at least one control threshold value between the upper band limit and the lower band limit;

wherein controlling the transmission power at the transmission feed-in point includes controlling the windfarm depending on whether the at least one control threshold value has been reached or exceeded to provide the requested real power as the transmission power at the transmission feed-in point.

24. A wind power installation for providing a requested real power at a transmission feed-in point, of an electrical supply grid, that electrically connects a first voltage segment to a second voltage segment, comprising:

an installation controller configured to receive a control signal from a higher-level controller; and a feed device configured to feed an installation power into a farm grid depending on the received control signal;

wherein the installation controller is configured to control a transmission power at the transmission feed-in point using a real power band having an upper band limit and a lower band limit each being at a respective offset from the requested real power and at least one control threshold value between the upper band limit and the lower band limit;

wherein controlling the transmission power at the transmission feed-in point includes controlling the wind power installation depending on whether the at least one control threshold value has been reached or exceeded to provide the requested real power as the transmission power at the transmission feed-in point.

* * * * *